R. HOLMAN.
ROASTER.
APPLICATION FILED JAN. 3, 1913.
1,111,460.
Patented Sept. 22, 1914.
2 SHEETS—SHEET 1.
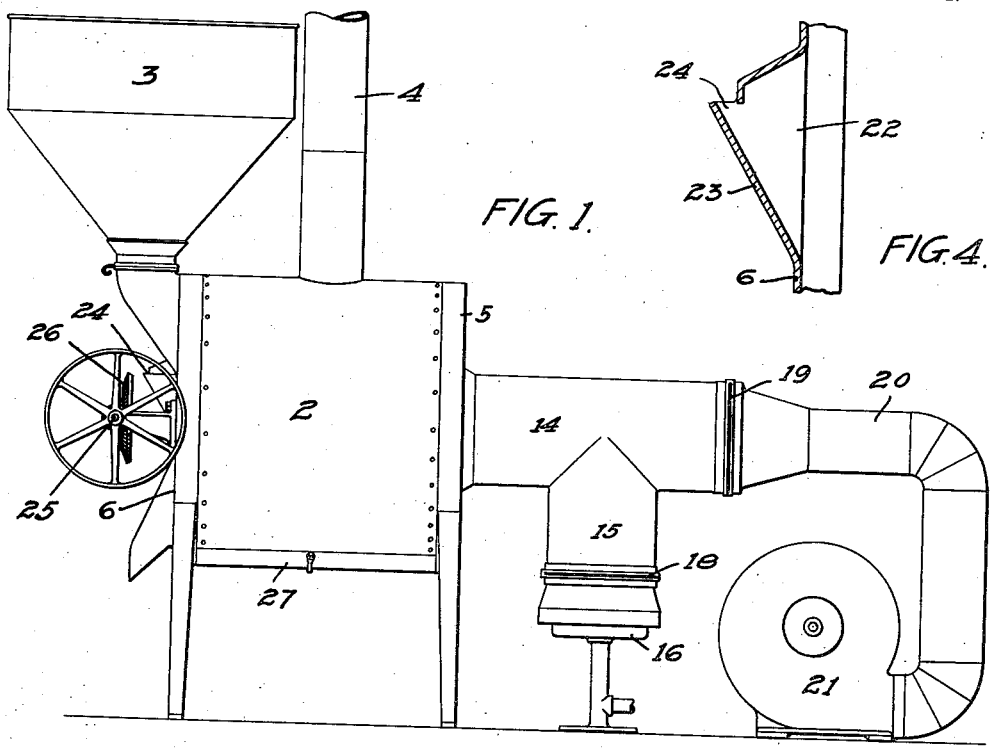
FIG. 1.
FIG. 4.
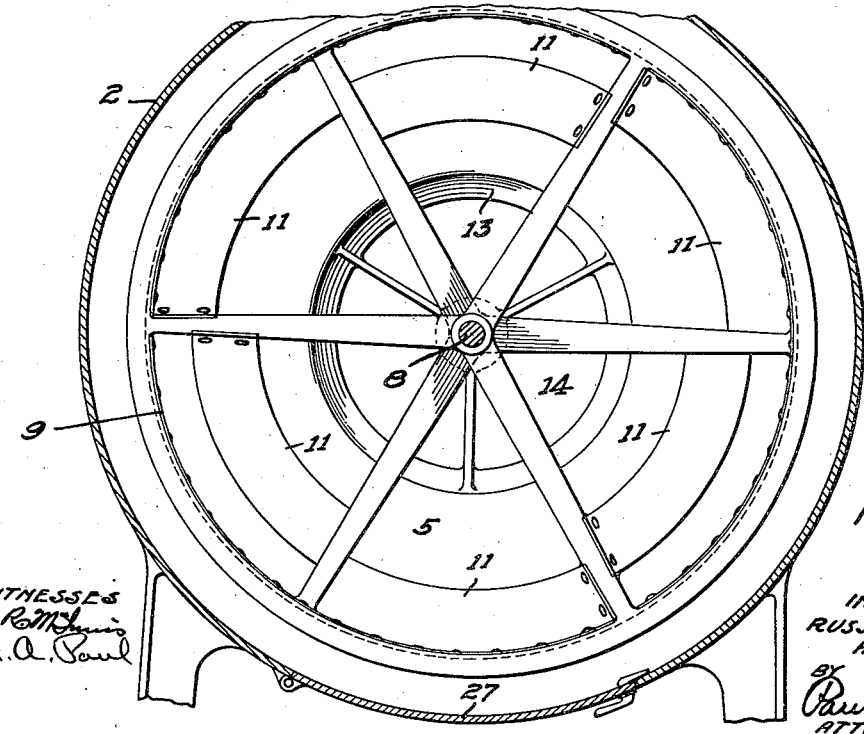
FIG. 2.
WITNESSES
M. R. M—
E. A. Paul
INVENTOR
RUSSELL HOLMAN
BY
Paul & Paul
ATTORNEYS

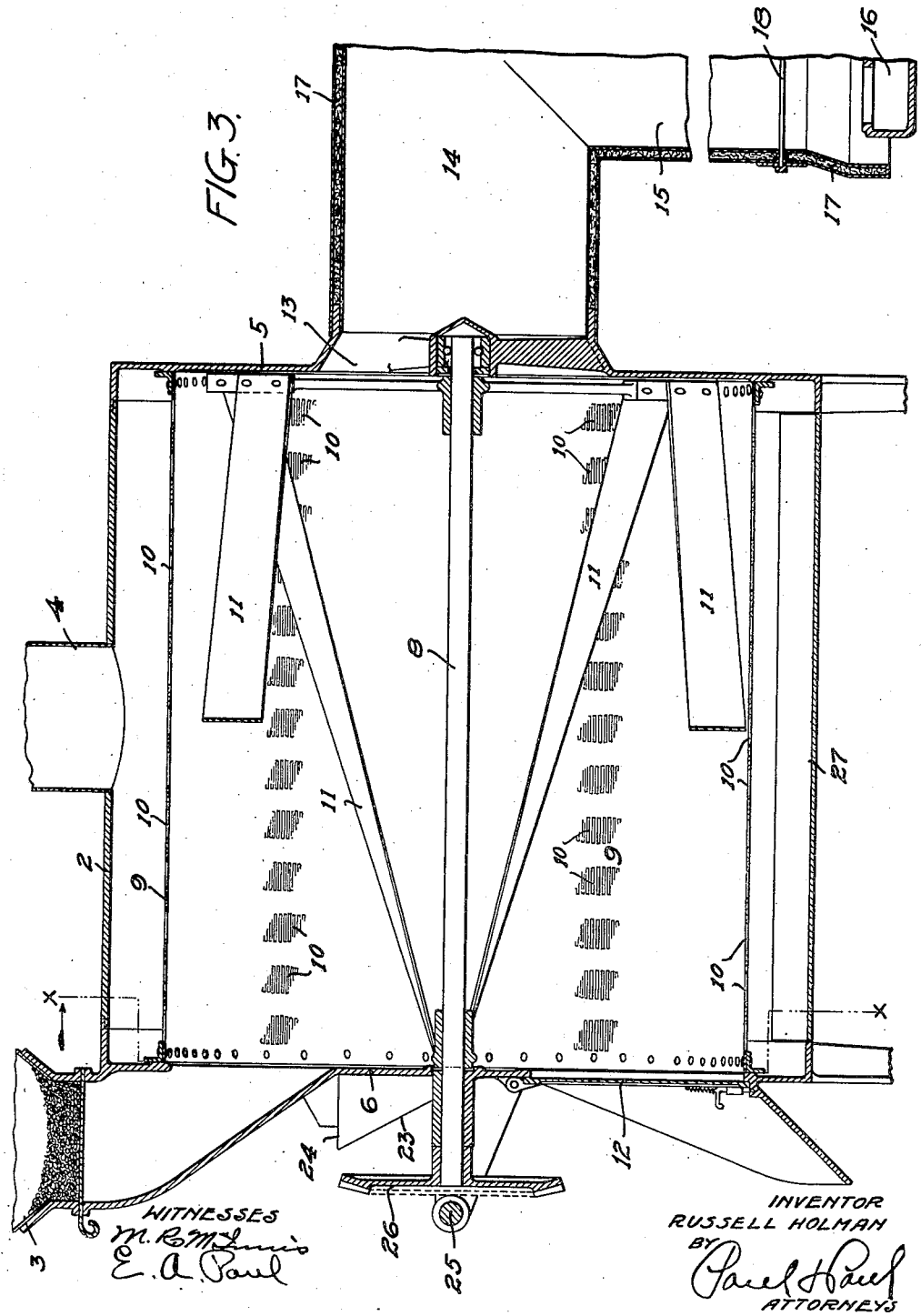

UNITED STATES PATENT OFFICE.

RUSSELL HOLMAN, OF MINNEAPOLIS, MINNESOTA.

ROASTER.

1,111,460.  Specification of Letters Patent.  Patented Sept. 22. 1914.

Application filed January 3, 1913. Serial No. 739,970.

*To all whom it may concern:*

Be it known that I, RUSSELL HOLMAN, a citizen of the United States, resident of Minneapolis, in the county of Hennepin, State of Minnesota, have invented certain new and useful Improvements in Roasters, of which the following is a specification.

My invention relates to roasters and particularly to that type used for roasting coffee.

Generally in an apparatus of this kind the coffee is roasted by heat from a gas flame located beneath the revolving cylinder containing the coffee, and when the coffee has been roasted it is removed from the cylinder to suitable cooling pans. This method has been found objectionable, as the direct exposure of the coffee to the flame frequently results in over-roasting or burning and oftentimes the chaff from the kernels will become ignited in the cylinder and seriously damage the coffee. Furthermore, considerable time and labor is required to remove the coffee to a pan or other receptacle for cooling purposes.

The object, therefore, of my invention is to provide an apparatus in which the coffee can be thoroughly roasted without direct exposure to the burners.

A further object is to provide an apparatus in which, when the heat is shut off the roasted coffee may be easily and quickly cooled without removal from the roaster.

Other objects of the invention will appear from the following detailed description.

The invention consists generally in various constructions and combinations, all as hereinafter described and particularly pointed out in the claims.

In the accompanying drawings forming part of this specification, Figure 1 is a side elevation of a coffee roaster embodying my invention, Fig. 2 is a transverse sectional view taken on line x—x of Fig. 3, Fig. 3 is a longitudinal sectional view, Fig. 4 is a detail view of the sample opening through which access may be had to the coffee.

In the drawing, 2 represents a suitable casing having a hopper 3 from which coffee is discharged into the cylinder, and a vent pipe 4 through which the heated air passes from the cylinder. The casing is provided also with heads 5 and 6 having bearings for a centrally arranged shaft 8 on which the coffee cylinder 9 is mounted. This cylinder may be of any suitable or preferred construction and is provided with the usual openings 10 for the circulation of the hot air through the coffee and with the agitating bars or blades 11. I make no claim, however, in this application to the structure of the cylinder and hence it need not be described in detail. It has an opening through which the coffee is received from the hopper.

The head 6 is provided with a door 12 which, when opened, allows the discharge of the coffee from the cylinder. The head 5 is provided with a central opening 13 communicating with a trunk 14 having a downward extension 15, the lower end of which is open and encircles an ordinary gas burner 16. This trunk and extension are covered with a suitable non-heat conducting material 17, preferably asbestos. The extension 15 is provided with a slide 18 by means of which the passage therethrough may be closed and a similar slide 19 is provided in the trunk 14 between its open outer end and a pipe 20 which leads to a centrifugal fan 21. When the gas at the burner 16 is ignited, a circulation will be established through the trunk 14 through and around the revolving cylinder and into the exhaust pipe 4, and the coffee will be thoroughly and evenly roasted without coming in proximity to the gas flame. When the coffee has been roasted, the gas is turned off and the slide 18 is closed and the slide 19 opened, the latter being normally closed during the roasting operation, and when the fan is set in motion drafts of cold air will be blown through the trunk 14 into the cylinder and through the coffee revolving therein. In this way the coffee may be thoroughly cooled in a comparatively short space of time and without the necessity of removing it from the cylinder. When the coffee has been cooled, the door 12 may be opened and the coffee allowed to flow into a suitable receptacle.

At any time during the roasting operation the person in charge of the roaster may have convenient access to the coffee for examination by means of a sample opening 22 provided in the head 6 and through which the coffee will flow against the inclined wall 23 and be visible through the opening 24. The cylinder is operated by any suitable means, preferably from a driving shaft 25 geared at 26 to the shaft 8. At any time during the operation of the roaster a hinged door 27 in the bottom of the casing may be opened to allow the removal of the coffee hulls or other refuse material that may have accumulated in the bottom of the casing. Oftentimes in an ordinary roaster this refuse will ignite and damage the coffee, but all possibility of that is avoided by locating the heating burner outside of the casing and at a distance from the cylinder.

I do not wish to be confined to any particular size of this apparatus as it may be modified in various ways according to the capacity desired.

I claim as my invention:—

1. A coffee roaster comprising a stationary casing having an inlet opening and a hot air pipe communicating therewith, and a vent opening for the discharge of the heated air, said casing also having a filling opening and a hopper communicating therewith and a discharge opening in its lower walls and a door therefor, a drum mounted to revolve within said casing and having open ends, the opening in one end being opposite and adjacent said hot air inlet opening, the opening in the other end of said drum being positioned to receive the coffee from said hopper and also to allow the discharge of the roasted coffee from said drum when said door is opened, said drum having means for agitating the coffee therein and provided with perforations in its walls through which the air may circulate, means for supplying hot air to said pipe and drum, and means for forcing cool air through said pipe into said drum when the roasting operation is completed.

2. A coffee roaster comprising a casing having an inlet opening and a hot air pipe communicating therewith and a vent for the discharge of the heated air, said casing also having a filling opening and a hopper communicating therewith and a discharge opening in its lower walls and a door therefor, a drum mounted to revolve within said casing and having open ends, the opening in one end being opposite and adjacent said hot air inlet opening, the opening in the other end of said drum being positioned to receive the coffee from said hopper and also to allow the discharge of the roasted coffee from said drum when said door is opened, said drum having perforations in its walls through which the air may circulate, and means for supplying heated air to said pipe and drum.

3. A roaster comprising a casing having a hot air intake and an exhaust opening and means for supplying hot air to said intake, a cylinder mounted to revolve within said casing and spaced from the walls thereof and having an opening to receive the heated air and also having perforations in its walls through which the heated air may circulate within said cylinder and within the space between said cylinder and said casing, the inner surface of said cylinder being unobstructed to allow the material therein to slide on said surface as said cylinder revolves, substantially as described.

4. A coffee roaster comprising a casing having a hot air inlet opening and a vent opening, said casing also having a filling opening, a drum mounted to revolve within said casing and spaced from the walls thereof and having perforations leading from the space within said drum to the space between said drum and casing, said drum having an opening in one end communicating with said hot air intake opening and also having an opening to receive the coffee from said filling opening, means for agitating the coffee within said drum during its revolution, and means for supplying heated air to the intake opening of said casing and to said drum.

5. A roaster comprising a casing having a hot air inlet opening in one end thereof and a vent opening in its upper walls and also provided with a filling opening, a drum mounted to revolve within said casing and spaced from the walls thereof and having perforations leading from the space within said drum to the space between said drum and casing, said drum having an opening in one end to register with the inlet opening in said casing, a hot air trunk for supplying heated air to said openings, said drum also having an opening to register with the filling opening in said casing, said casing also having a discharge opening arranged to communicate with said drum.

6. A roaster comprising a casing having a hot air intake and an exhaust opening and means for supplying heated air to said intake opening, a drum mounted to revolve within said casing and spaced from the walls thereof and having an opening to receive the heated air from said intake opening and also having perforations in its walls through which the heated air may circulate within said drum and within the space between said drum and casing, the material to be roasted lying on the walls of said drum and flowing over the inner surface thereof as said drum revolves and being thereby exposed to the currents of heated air flowing through said perforations and through the space between said perforations and casing.

7. A coffee roaster comprising a casing having a hot air intake opening and a vent for the discharge of the heated air, said casing also having a filling hopper and a discharge opening, a drum mounted to revolve within said casing and communicating at one end with said hot air intake to receive heated air therefrom and provided in its peripheral wall with perforations through which the heated air may pass and circulate between the wall of said drum and said casing, said drum also having an opening positioned to receive the coffee from said hopper and allow the discharge of the roasted coffee through the discharge opening in said casing, and means for supplying heated air to said casing and drum.

In witness whereof, I have hereunto set my hand this 28th day of December 1912.

RUSSELL HOLMAN.

Witnesses:
 EDWARD A. PAUL,
 GENEVIEVE E. SORENSEN.